United States Patent [19]
Billings, Jr. et al.

[11] 3,949,157
[45] Apr. 6, 1976

[54] ELECTROSTATIC METALLIC SHIELD-INSERT ELEMENT FOR INSULATING CASTABLE MEMBERS

[75] Inventors: John Stannard Billings, Jr., Trafford; Donald J. Martahus, Export, both of Pa.

[73] Assignee: Westinghouse Electric Corporation, Pittsburgh, Pa.

[22] Filed: Sept. 17, 1974

[21] Appl. No.: 506,911

[52] U.S. Cl............... 174/73 R; 174/15 C; 174/28; 174/142
[51] Int. Cl.² ......................................... H02G 15/02
[58] Field of Search ......... 174/15 R, 15 BH, 16 BH, 174/15 C, 142, 21 R, 143, 152 R, 73 R, 28

[56] References Cited
UNITED STATES PATENTS

| | | | |
|---|---|---|---|
| 3,001,005 | 9/1961 | Sonnenberg | 174/142 |
| 3,391,243 | 7/1968 | Whitehead | 174/21 R |
| 3,469,223 | 9/1969 | Leonard | 174/11 BH |

FOREIGN PATENTS OR APPLICATIONS

| | | | |
|---|---|---|---|
| 537,560 | 12/1955 | Italy | 174/143 |
| 1,257,157 | 2/1960 | France | 174/15 BH |
| 543,131 | 1/1932 | Germany | 174/152 R |
| 872,002 | 7/1961 | United Kingdom | 174/142 |

*Primary Examiner*—Arthur T. Grimley
*Attorney, Agent, or Firm*—W. R. Crout

[57] ABSTRACT

A relatively-small-diameter conductive cylindrical tubing, or metallic rod element is wound helically in the shape of the desired electrostatic metallic shield element. The turns of the metallic coil, thus formed, may be cemented, soldered, welded or otherwise fastened together to thereby provide rigidity to the metallic shield, if desired. The turns of the metallic coil may, however, be separated from one another by a space. One or both ends of the coil may be bent transversely away from the shield's surface for use both as a physical support during casting, or encapsulation, and, alternatively, as conducting leads for grounding purposes, or for terminal connection purposes. The body portion of the insulating member may be composed of any suitable casting material, such as resinous material, either epoxy resin, or polyester resin, or Butyl rubber.

The insulating body may either be a spacer for spacing a high-voltage power-conductor member within an outer grounded piping system in gas-insulated power transmission equipment, for example, or, alternatively, the insulating member may be a somewhat conventional-type terminal-bushing body portion, providing an insulated conductor-lead into suitable electrical equipment, such as circuit-breaker equipment, current-transformer equipment, potential-transformer equipment, or like electrical apparatus, for example.

8 Claims, 14 Drawing Figures

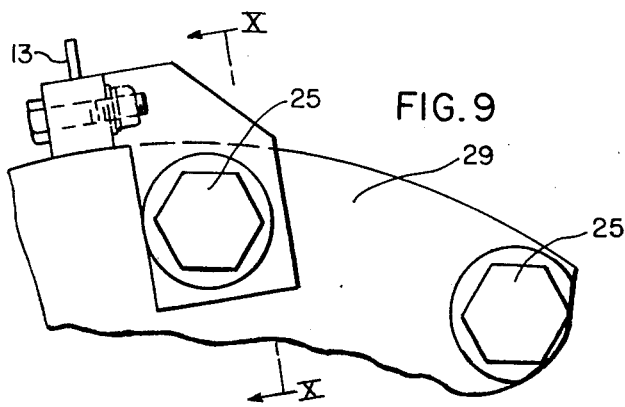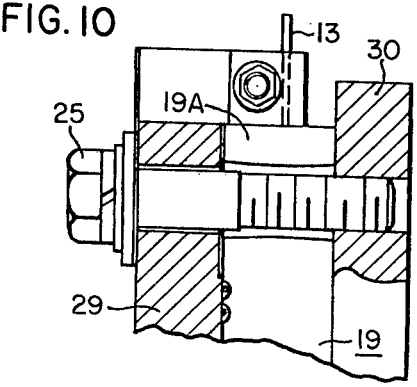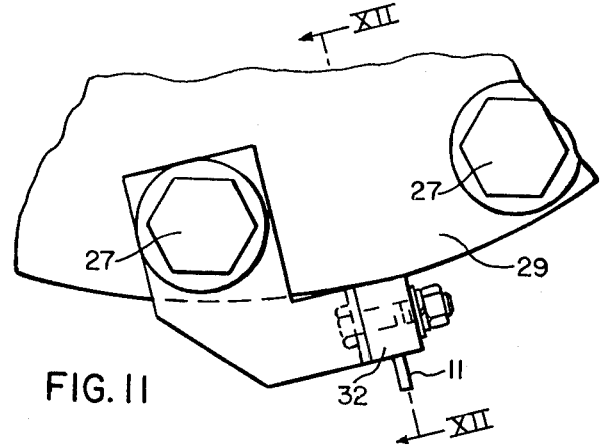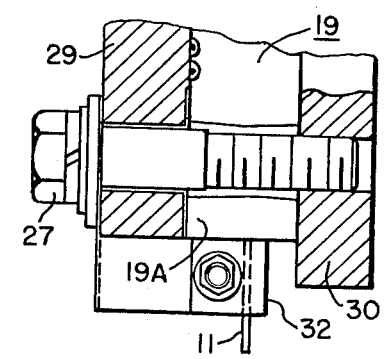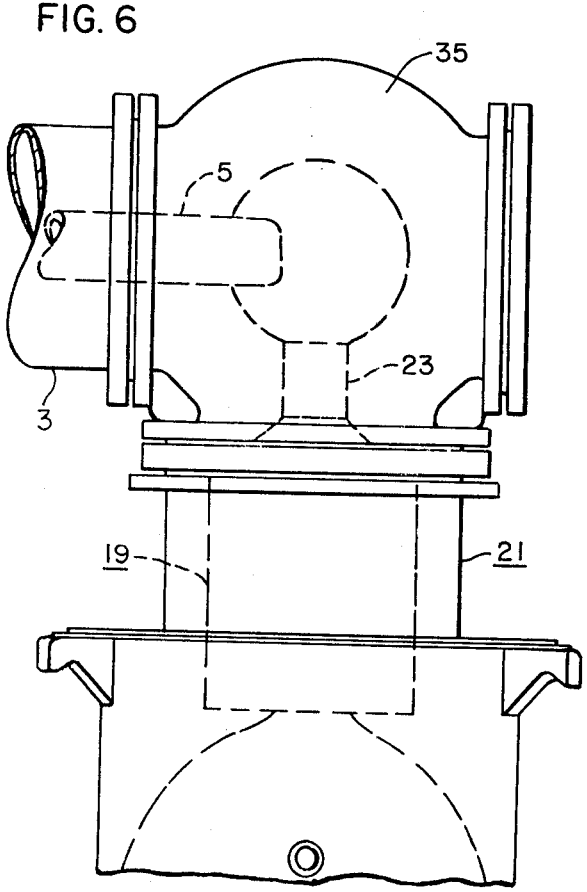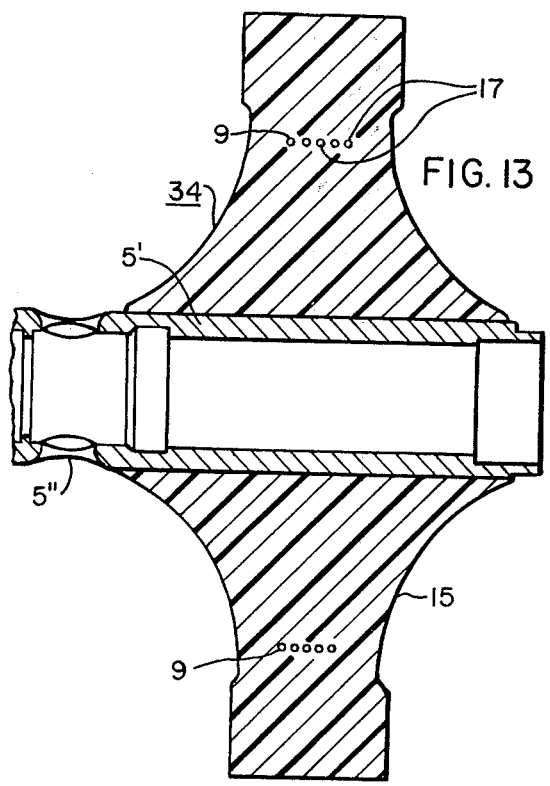

ELECTROSTATIC METALLIC SHIELD-INSERT ELEMENT FOR INSULATING CASTABLE MEMBERS

CROSS-REFERENCES TO RELATED APPLICATIONS

Applicants are not aware of any related patent applications pertinent to the present invention.

BACKGROUND OF THE INVENTION

It has been known in the past to attempt to accommodate the expansion of shield members and the surrounding encapsulating casting resin during the curing process for the casting of terminal-bushings, or like casting products. For example, reference may be made to U.S. Pat. No. 3,001,004, issued Sept. 19, 1961 to Richard G. Black. In this patent a slotted metallic shell is provided as a shell for forming a part of the resultant terminal-bushing. Also reference may be had to U.S. Pat. No. 3,001,005, issued Sept. 19, 1961 to Charles F. Sonnenberg, in which a cylinderical metallic screening may be embedded in the resin body 13 of a terminal-bushing. Casting materials are set forth for example in U.S. Pat. Nos. 2,997,526 - Kessel et al; 2,997,527 Kessel et al; and 2,997,528 - Kessel et al.

In U.S. Pat. No. 3,146,518, issued Sept. 1, 1964 to Mitsuhiro Kishida, a sprayed conducting layer of metal may be provided over sections in the successive building up to a suitable terminal-bushing. In U.S. Pat. No. 3,222,625, issued Dec. 7, 1967 to Marcel Ledocq screening is provided in a resinous-type terminal-bushing. Also a screening element is used in U.S. Pat. No. 3,230,301, issued Jan. 18, 1966 to Charles F. Sonnenberg and Donald J. Martahus.

In U.S. Pat. No. 3,265,799, issued Aug. 9, 1966 to James H. McWhirter, screening is used in centrifugally-formed sectional layers of a terminal-bushing.

SUMMARY OF THE INVENTION

In accordance with the present invention, generally helically-wound metallic hollow tubing, or metallic solid rodding is utilized as the electrostatic metallic shield element. Such an electrostatic shield element may be used as a ground connection, where desired, or it may also be utilized, obviously, as a potential tap for potential-measurement purposes, or, alternatively, as a terminal member or for voltage-distribution purposes. The invention comtemplates improved adherence, or bonding between the small-diameter conductive cylindrical tubing, or metallic rodding, used as an electrostatic shield element. This element may also be used as a voltage-tap device, or terminal element with the resin in which such electrical element is cast, or encapsulated, or for voltage-distribution purposes. The two ends of the metallic helical coil may, if desired, be bent transversely away from the shield surface for use both as a physical support during the casting process, and as leads for grounding purposes, or as a terminal, where desired. As a result, the bonding between the small-diameter hollow tubing, or solid metallic rodding and the surrounding encapsulating casting resin, or elastomeric material, is good, particularly when the metallic coil turns are physically separated from one another and the surrounding insulating material completely encapsulates each turn of the shield.

BRIEF DESCRIPTION OF THE DRAWINGS

FIG. 6 is a side-elevational view of an oil-insulated potential transformer utilizing a potential-transformer bushing; which incorporates the principles of the present invention;

FIG. 9 is a fragmentary enlarged view showing the mounting hardward of a possible mounting arrangement utilized in connecting the external ends of the metallic electrostatic shield element of FIG. 4;

FIG. 10 is a fragmentary sectional view taken substantially along the line X—X of FIG. 9 looking in the direction of the arrows;

FIG. 11 is a fragmentary view taken on the opposite side of the flange assembly of the terminal bushing of FIG. 7, with the mounting hardware utilized for making a connection to the lead extending laterally from the metallic helical tubing, or metallic rodding of the electrostatic shield element of FIG. 4;

FIG. 12 is a sectional view taken substantially along the line XII—XII of FIG. 11 looking in the direction of the arrows; and, FIG. 13 is a vertical sectional view taken through a modified-type of spacer-element, somewhat similar to that of FIG. 3, but illustrating an expansion joint associated with the inner high-voltage power-conductor.

DESCRIPTION OF THE PREFERRED EMBODIMENTS

Figure 1:
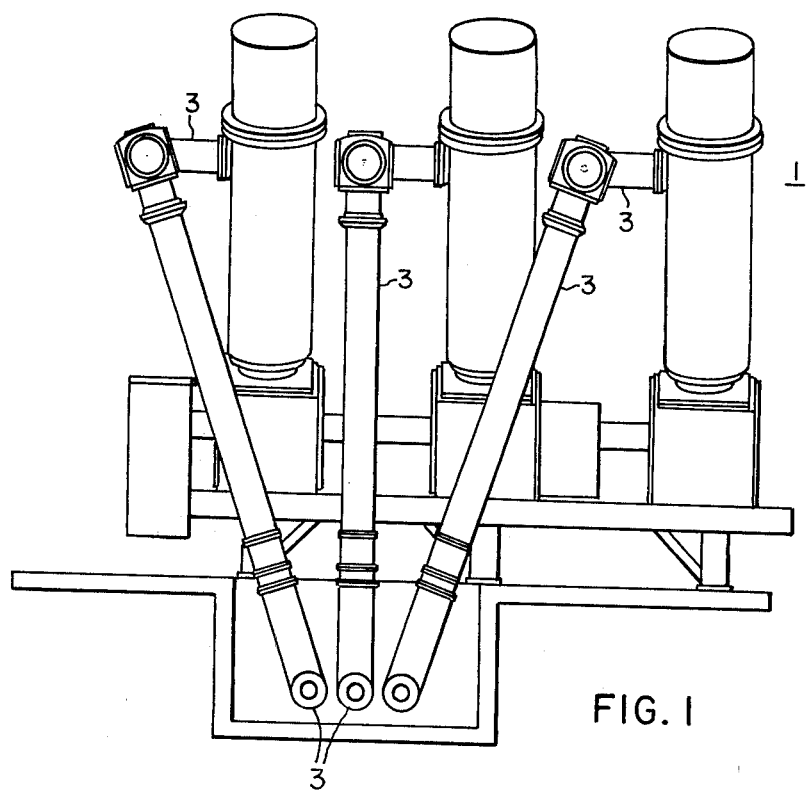
FIG. 1 illustrates a somewhat diagrammatic view of gas-insulated power-transmission electrical equipment in which grounded pipes or casings carry interiorly-disposed high-voltage "live" power conductors spaced radially inwardly within the pipe from the outer grounded casing of the piping by insulating spacers, which incorporate principles of the present invention.

With reference to the drawings, and particularly to FIG. 1 thereof, it will be observed that there is provided a somewhat diagrammatic view of gas-insulated transmission equipment 1 including gas-insulated piping 3. Reference may be had to the following patents for general background information regarding the gas-insulated transmission equipment 1 set forth in FIG. 1: U.S. Pat. No. 3,391,243 - Whitehead; U.S. Pat. No. 3,378,731 - Whitehead; U.S. Pat. No. 3,348,001 - Upton et al; and U.S. Pat. No. 3,345,450 - Spindle.

Figure 2:
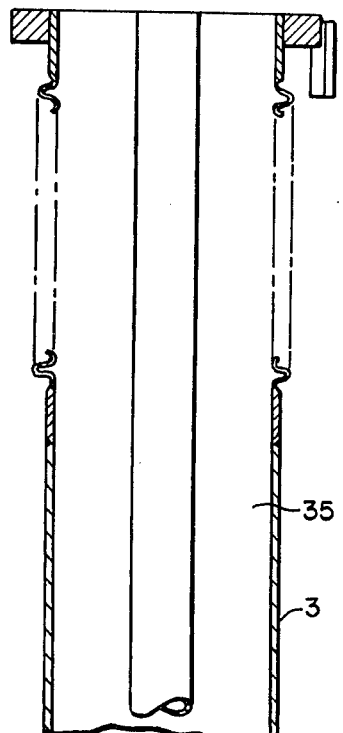
FIG. 2 is a considerably-enlarged view of a portion of the grounded piping of FIG. 1, showing, in more detail, a disc-shaped insulating spacer incorporating the principles of the present invention.

As shown in FIG. 1, generally-upwardly-extending grounded piping 3 carries an interiorly-disposed high-voltage conductor 5, more clearly shown in FIG. 2. The inner high-voltage conductor 5 may be of tubular configuration, as shown in FIG. 2, and may be interconnected with other laterally-arranged feeder conductors 5A, 5B, as shown. Reference may be had to the following U.S. Pat. No. in regard to additional background information relevant to the coupling arrangement, as shown in FIG. 2: U.S. Pat. 3,801,725, issued April 2, 1974 to Owen Farish.

Figure 5:
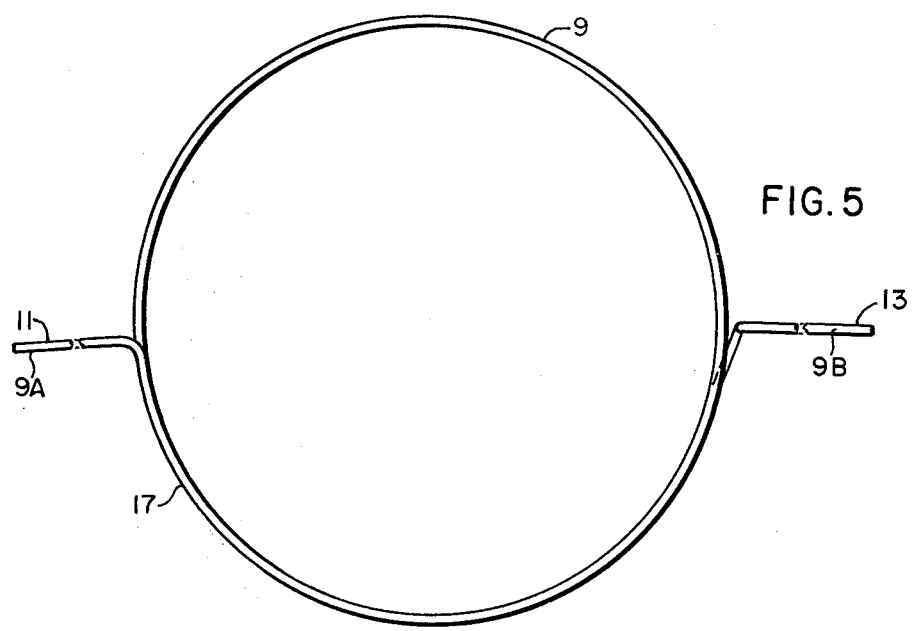
FIG. 5 is a top plan view of the metallic helically-arranged rodding, or tubing element itself of FIG. 4.
Figure 4:
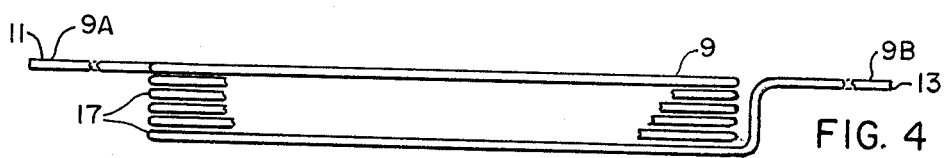
FIG. 4 is a side-elevational view of the metallic helical electrostatic shield-insert element only of the present invention.
Figure 3:
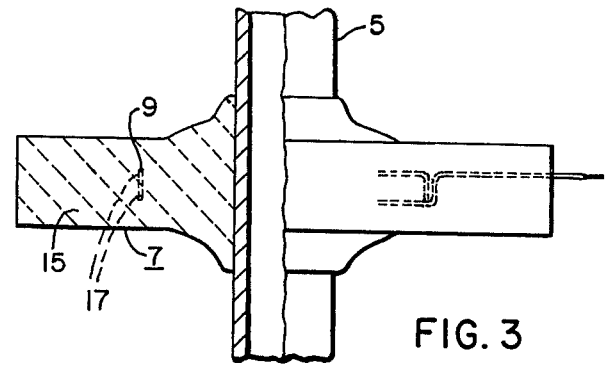
FIG. 3 is an enlarged view, partially in cross-section, of the insulating spacer illustrated in FIG. 2, again showing an incorporation of the helically-wound metallic rodding, or metallic tubing of the present invention.

FIG. 3 shows an insulating spacer 7 which serves to rigidly hold the interior high-voltage conductor 5, 5A, 5B inwardly from the outer grounded metallic casing of the transmission pipe 3. The insulating spacer 7, shown in detail in FIG. 3, utilizes the improved electrostatic metallic element 9 of the present invention, a detailed showing of which is set forth more fully in FIGS. 4 and 5 of the drawings. As shown in FIGS. 4 and 5, it will be observed that there is provided a helically-arranged metallic rodding, or metallic tubing 9, which has the end extremeties 9A, 9B bent laterally outwardly to form suitable conducting leads, or terminals 11, 13, as more fully described hereinafter. The electrostatic metallic element 9, set forth in FIGS. 4 and 5, is encapsulated in a suitable casting resin 15, as well known by those skilled in the art. Reference may be had to the aforesaid patents, set forth above under the heading of "Background of the Invention", for a disclosure of suitable casting materials 15. The present invention, however, is not restricted, of course, to any particular casting resin 15, and is suitable for encapsulation with any type of epoxy resin, or polyester resin, a particularly suitable type of crack-resistant casting resin composition 15 being set forth in U.S. Pat. No. 3,434,087, issued March 18, 1969 to Charles F. Hoffman, and assigned to the assignee of the instant patent application.

In electrical components, conductive shields are often used to control or to reduce the voltage gradients at or adjacent to corners, sharp edges, or other conductive surfaces. Shields are also used to control the voltage gradients along the surfaces and within the volume of insulating materials.

An electrostatic shield must, in most cases, have relatively smooth surfaces, with no sharp corners, or points projecting from the surfaces subject to the electrical field. Thus, torodial, spherical, and similar continuous surfaces are often used as shields in insulating fluids.

Past experience has shown that it is very difficult to obtain a good bond or adherence, which is essential for efficient electrical shielding, between large smooth metal surfaces and an encapsulating surrounding resin. Thus, various configurations, materials, and techniques have been used to enhance the bond. Perforated foils and fine mesh have worked acceptably, but are difficult to form, support during casting, and attach leads to for purposes of grounding.

Specifically, this invention embodies a novel means of providing an electrostatic metallic shield insert 9 for cast resin bodies 15. A small-diameter conductive metallic cylindrical hollow tubing, or metallic solid rod 9 is wound helically in the shape of the desired surface. The turns of the metallic coil, thus formed, may be cemented, soldered, welded, or otherwise fastened together to provide rigidity to the shield, if desired. Best results may be obtained by separating the metallic turns 17 physically to allow the resin 15 to completely encapsulate each turn 17. The two ends 9A, 9B of the coil 9 may be bent away from the shield surface for use both as physical support during casting, and as conducting leads 11, 13 for grounding purposes. The metallic ends 11, 13 may be formed, or specially prepared to accept couplers or other fasteners for electrical or mechanical connections. They may also be used as inlets or outlets for a cooling fluid providing metallic tubing is used, as shown in more detail in FIG. 4A of the drawings.

The novel configuration proposed by this invention shows considerable improvement over prior art for the following reasons:

1. Small-diameter conductive tubing or metallic rod 9 is readily available and inexpensive.
2. Cylindrical metallic tubing and rod 9 have smooth uniform surfaces.
3. Small-diameter metallic tubing and rod are easily formed.
4. Bonding between small diameter metallic tubing and rod 9 and the encapsulating resin 15 is good providing the metallic coil turns 17 are physically separated.
5. Composite surfaces, such as closely-wound metallic coils, provide good electrical shielding if they are smooth.
6. There is no need for making electrical or mechanical connections to a metallic coil at the shielding surface.
7. Helically-wound metallic coils can be made very rigid which helps guarantee proper placement in the cast resin, and simplifies handling and storage.
8. Electrical and mechanical connections may be easily made to the ends of the metallic coil.
9. Dimensions can be held to close tolerances.
10. If used, cylindrical metallic tubing may also be employed as a cooling system as well as electrostatic shield, as shown in more detail in FIG. 4A of the drawings.

Figure 4A:
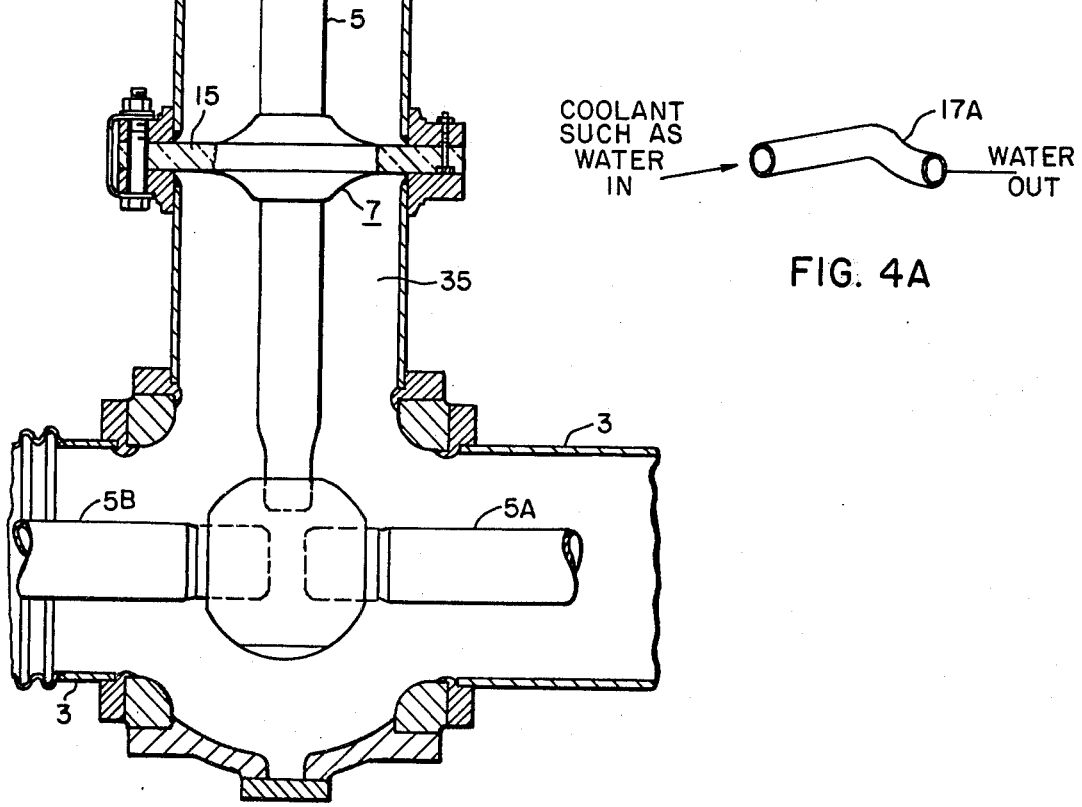
FIG. 4A shows a water-cooled metallic electrostatic element.
Figure 7:
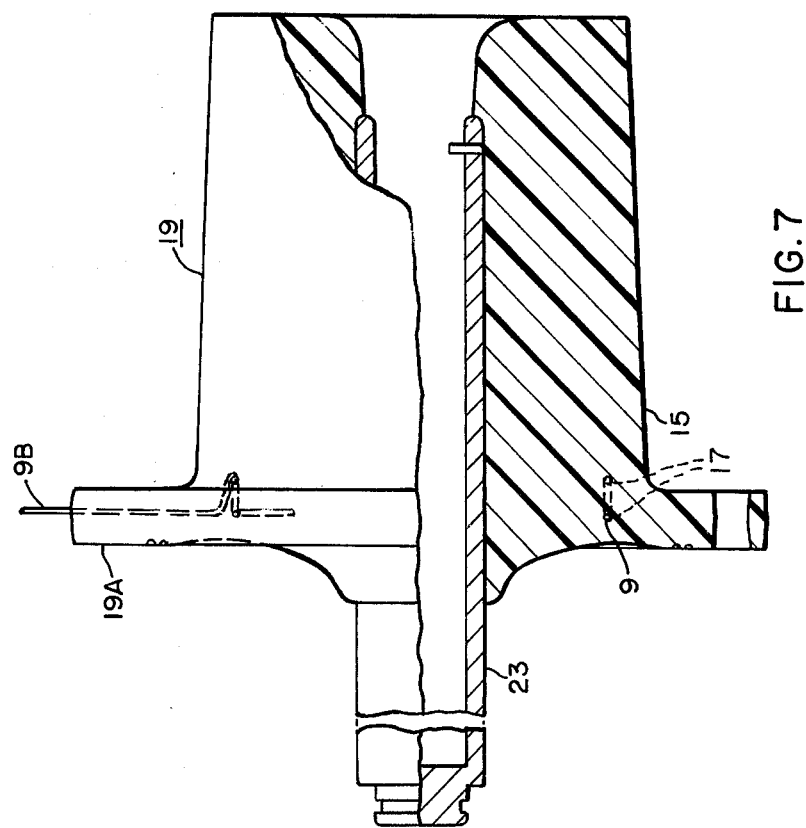
FIG. 7 is a detailed enlarged vertical sectional view, partly in side elevation, of the potential-transformer terminal-bushing member of FIG. 6.
Figure 8:
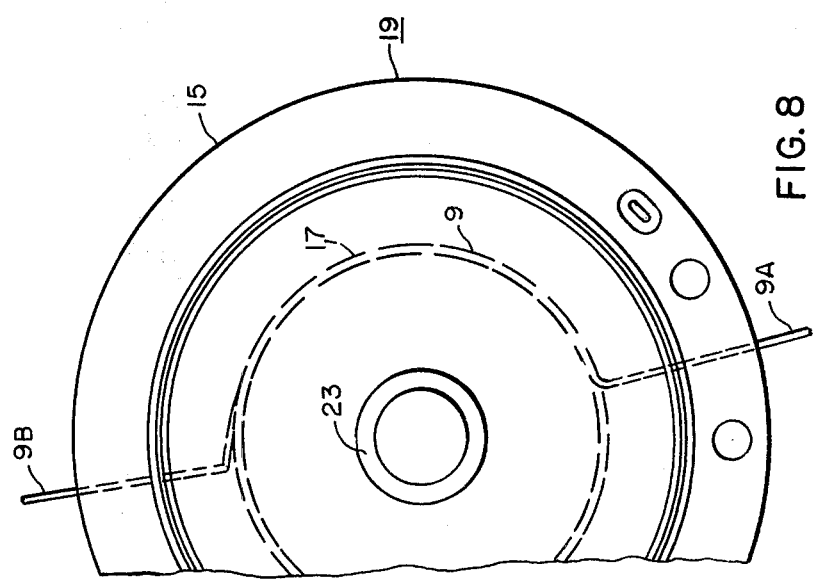
FIG. 8 is a top plan view of the potential-transformer terminal-bushing member of FIG. 7.

Although the spacer element, set forth in FIG. 3, and incorporated in the equipment of FIG. 2, is an exemplification of the instant invention, nevertheless the advantageous features of the present invention may be incorporated within terminal-bushings 19, such as shown in FIGS. 7 and 8 of the drawings, which illustrate a potential-transformer bushing. This bushing 19 may be used in a potential transformer 21 of the type illustrated in FIG. 6 of the drawings, as well known by those skilled in the art. In such equipment, it is, of course, necessary to provide an insulated lead 23 into the equipment. With reference to FIGS. 7 and 8, it will be observed that again the helically-wound metallic rodding, or metallic tubing 9 may be used to advantage, which forms a good bond, or adherence with the encapsulating surrounding resin 15 utilized in the casting process of the part. Also, the metallic tubing 17A may be used for fluid flow to cool the metallic shield 9 as shown in FIG. 4A of the drawings.

With regard to the mounting hardward utilized for attaching to the end leads 11, 13 of the metallic electrostatic shield 9, reference may be had to FIGS. 9–12, inclusive, which illustrate, in detail, mounting bolts 25, 27 which not only hold the supporting flange portion 19A fixedly between two confronting metallic flange members 29, 30, but also maintain the outer periphery of the potential-transformer busing 19 in a rigid position. The outer lead 11, as shown in FIG. 11, may be secured by bolts 27 to a hardware terminal member 32, the latter, in turn, being secured by mounting bolts 27 to the supporting-flange portion 19A. FIGS. 9 and 10 show a somewhat similar construction in which a secure electrical lead 13 is provided by the same mounting-bolt construction.

FIG. 13 shows a modification of the spacer construction of FIGS. 2 and 3, and in this instance the spacer 34 may be cast with the interior high-voltage conductor 5', an expansion joint 5" being provided, if desired. As well known by those skilled in the art, such spacers 7, 34 are utilized at spaced intervals along the gas-insulated piping 3, the latter containing a suitable insulating gas 35, such as sulfur-hexafluoride ($SF_6$) gas, for example. The spacers 7, 34 are disposed at spaced intervals along the piping 3, and serve to maintain the high-voltage inner-disposed conductor 5 at a safe distance from the outer grounded metallic casing 3 of the piping. Again FIG. 13 shows the utilization of the helically-wound metallic rodding, or metallic tubing 9, which affords a good bond between the casting resin 15 and the electrostatic metallic shield element 9.

Although there have been illustrated and described specific structures, exemplifying particular forms of the invention, it is to be clearly understood that the same were merely for the purpose of illustration, and that changes and modifications may readily be made therein by those skilled in the art, without departing from the spirit and scope of the invention.

We claim:

1. In combination, a high-voltage electrical piece of equipment comprising a cast insulating member formed of a suitable resinous casting composition and an interiorly disposed encapsulated helically-arranged metallic rod-element serving as an electrostatic shield element for either a ground tap or potential-measurement purposes.

2. The combination according to claim 1, wherein the helically-wound metallic shield is formed of tubular material.

3. The electrostatic metallic shield element of FIG. 1 in which the metallic shielding element is of rodding.

4. The combination according to claim 3, wherein one or both ends of the metallic rodding are extended radially outwardly to form a terminal element.

5. The combination according to claim 2, wherein both ends of the helically-arranged metallic rodding shield are extended radially outwardly to form conducting terminal members.

6. The combination in a gas-insulated transmission piping system of an outer metallic grounded casing element, an interiorly-disposed high-voltage power-conductor, at least one insulating spacer, said insulating spacer having a helically-wound metallic rodding element encapsulated therein and cast therein during the fabrication process of the spacer.

7. The combination according to claim 6, wherein at least one end of the helically-arranged metallic rodding element is extended outwardly to form a conducting terminal therefor.

8. The combination according to claim 2 wherein a fluid is circulated through the metallic tubing for purposes of cooling.

* * * * *